Dec. 2, 1930.  R. LA FRANCE  1,783,191
MACHINE FOR FORMING GLASS ARTICLES
Original Filed April 22, 1924  6 Sheets-Sheet 2
FIG-2-
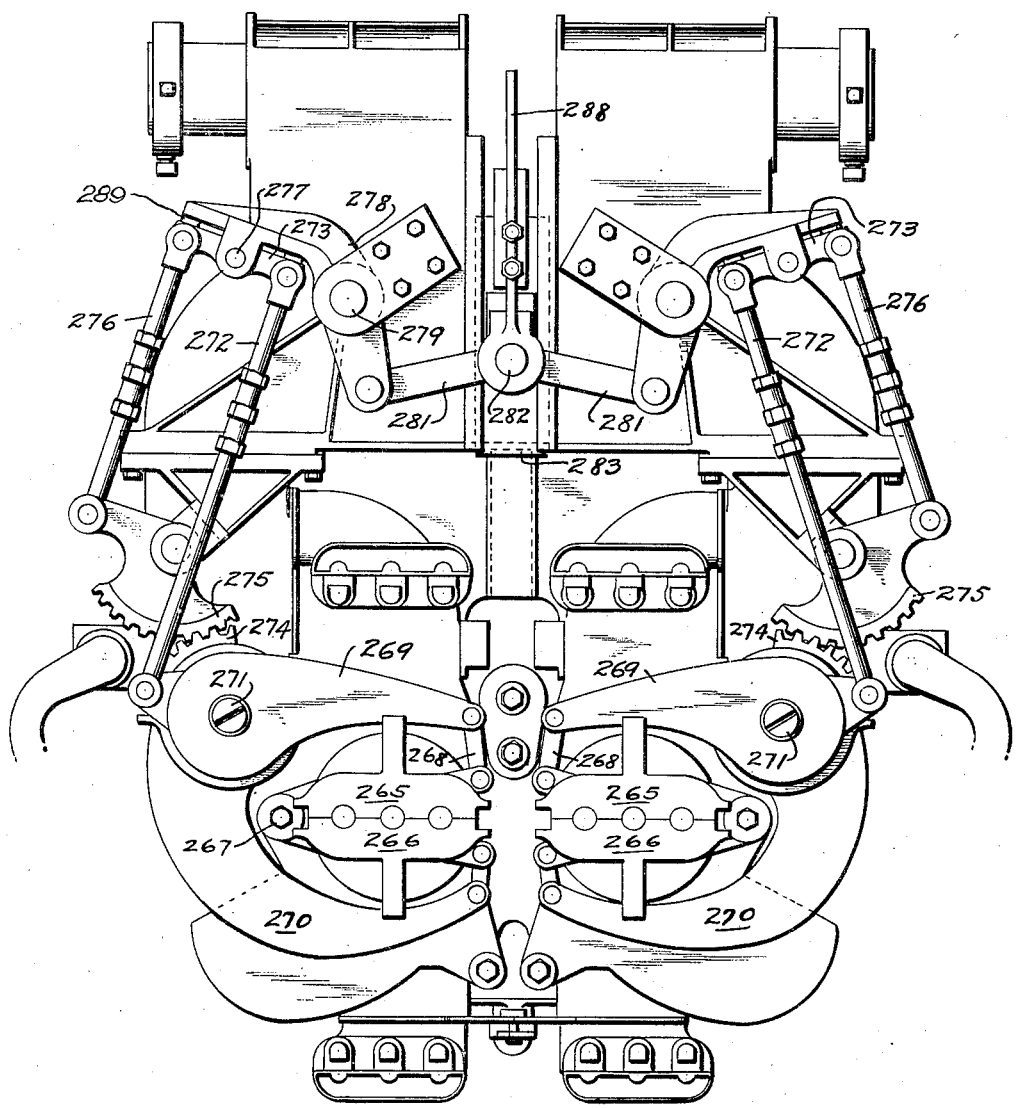
INVENTOR
Richard La France-
BY J.F. Rule,
HIS ATTY.

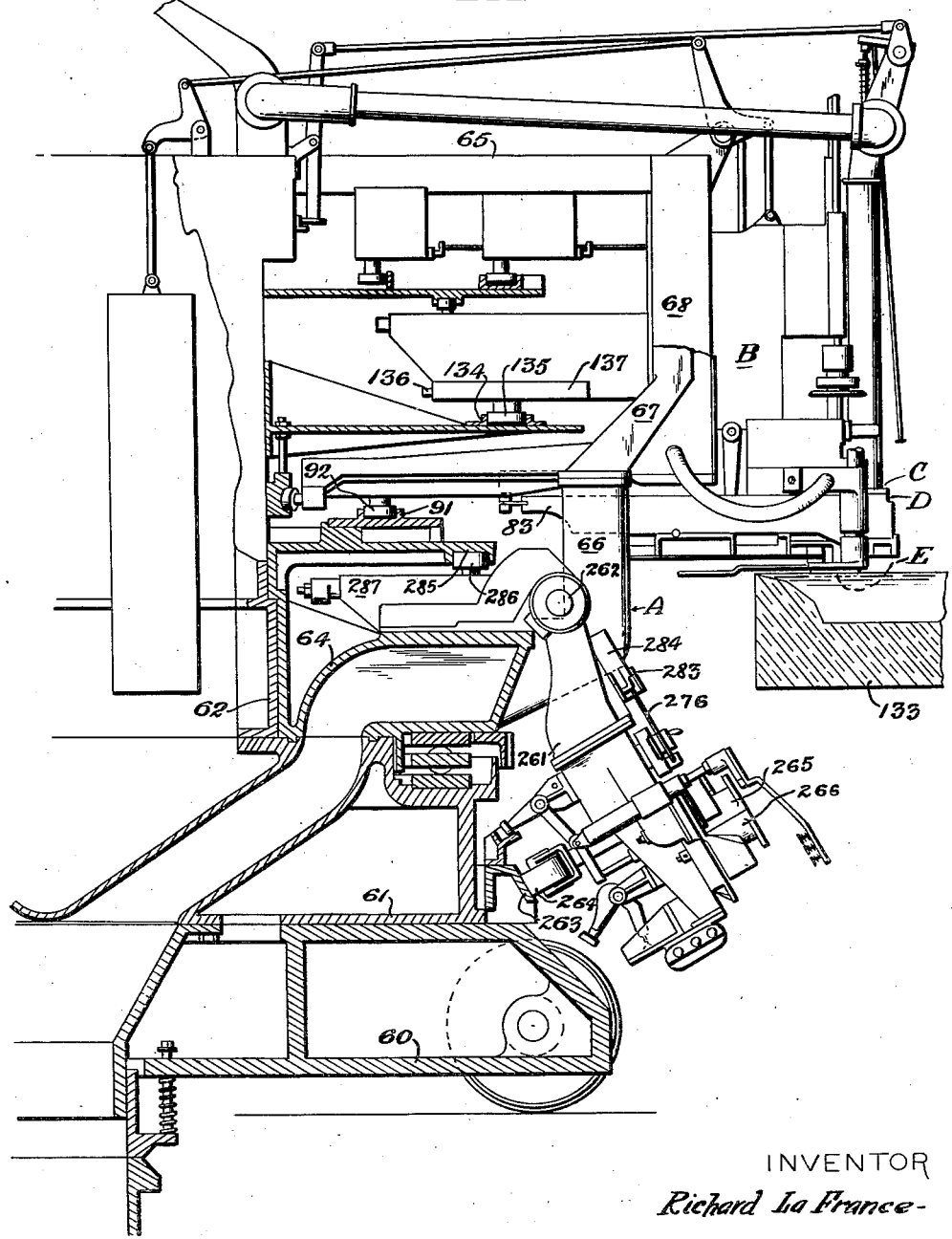

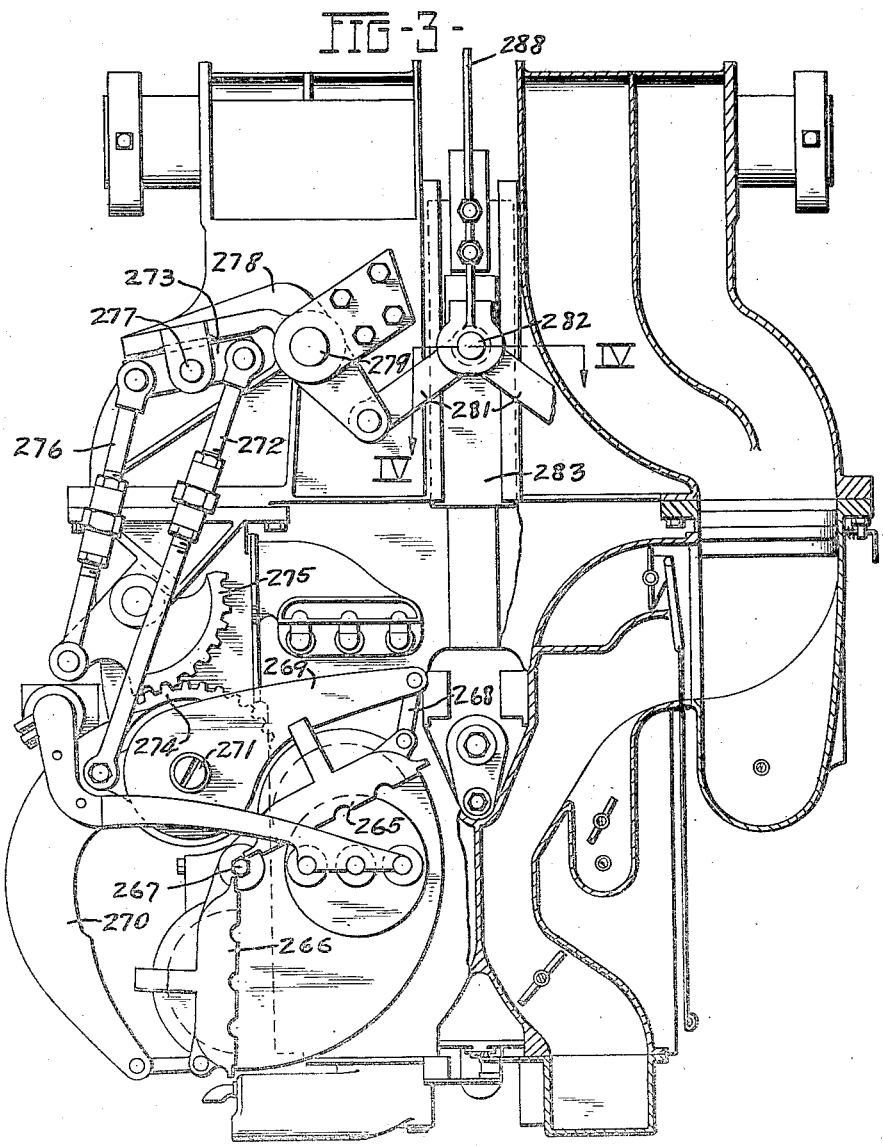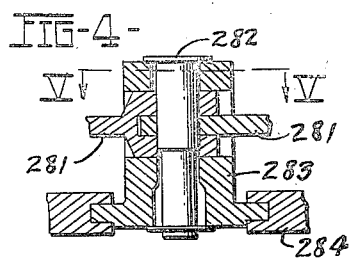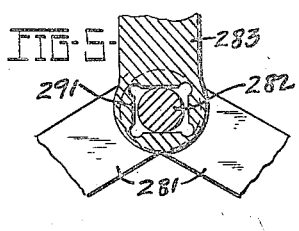

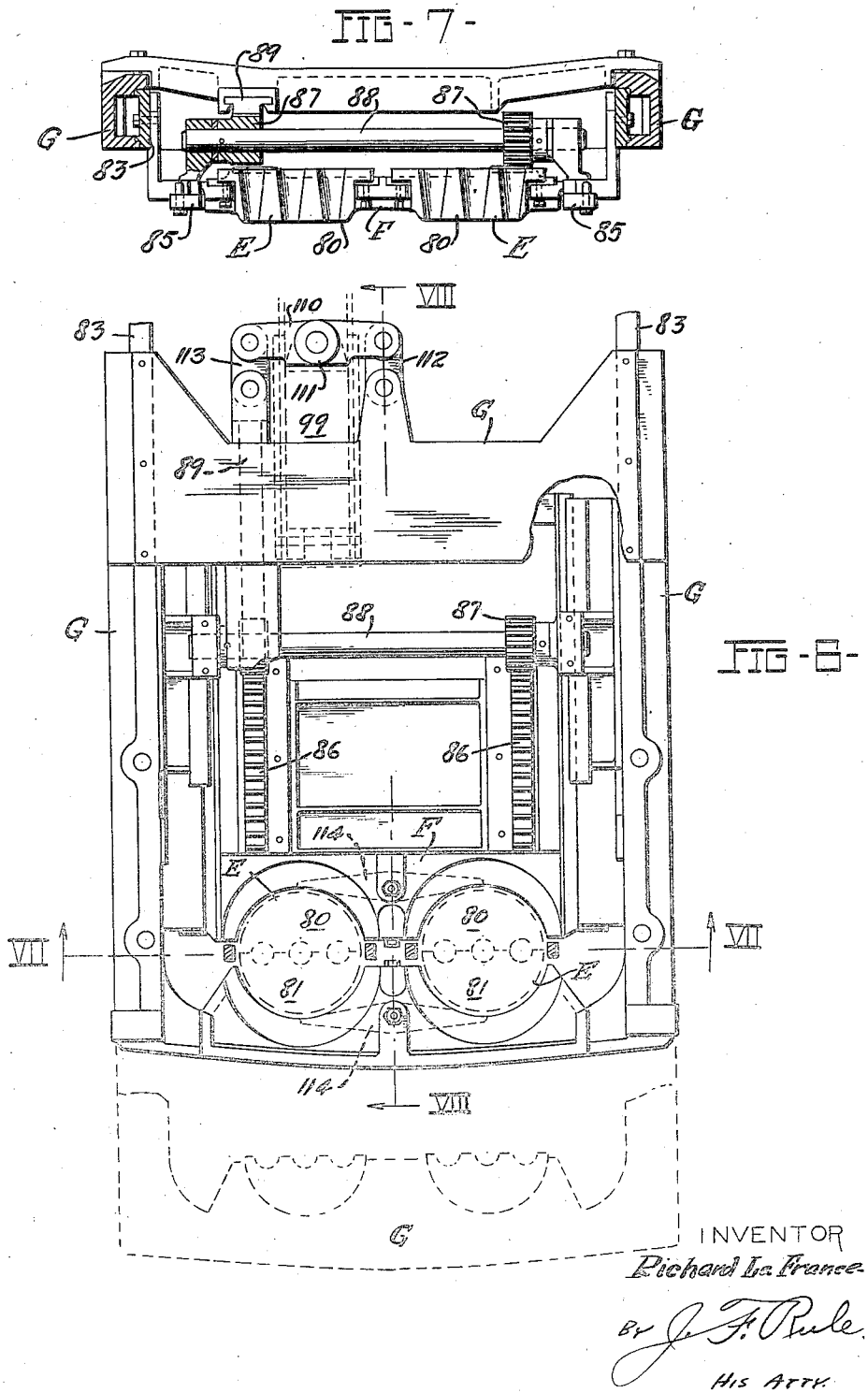

Dec. 2, 1930.  R. LA FRANCE  1,783,191
MACHINE FOR FORMING GLASS ARTICLES
Original Filed April 22, 1924  6 Sheets-Sheet 5
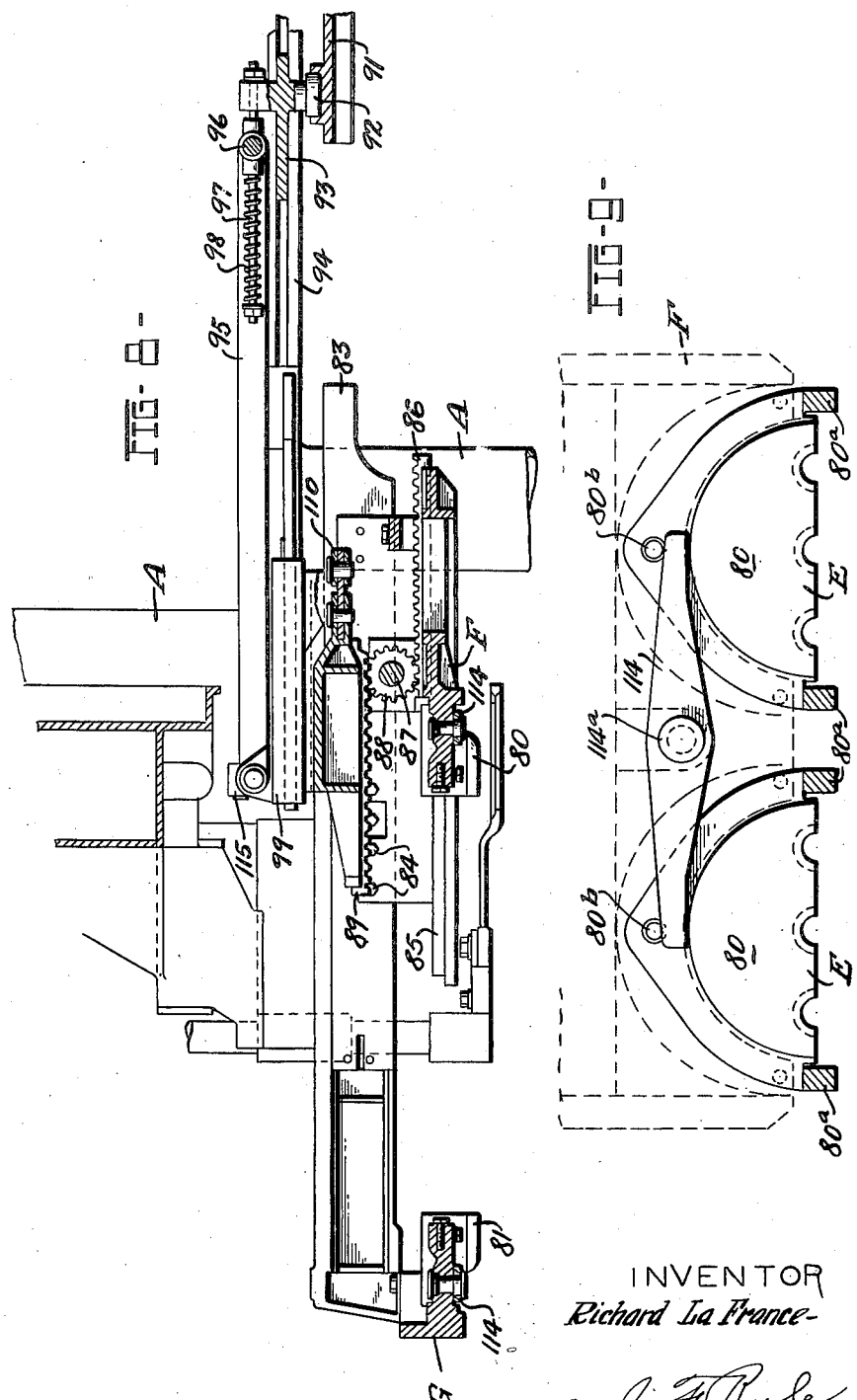
INVENTOR
Richard La France-
BY J. F. Rule.
HIS ATTY.

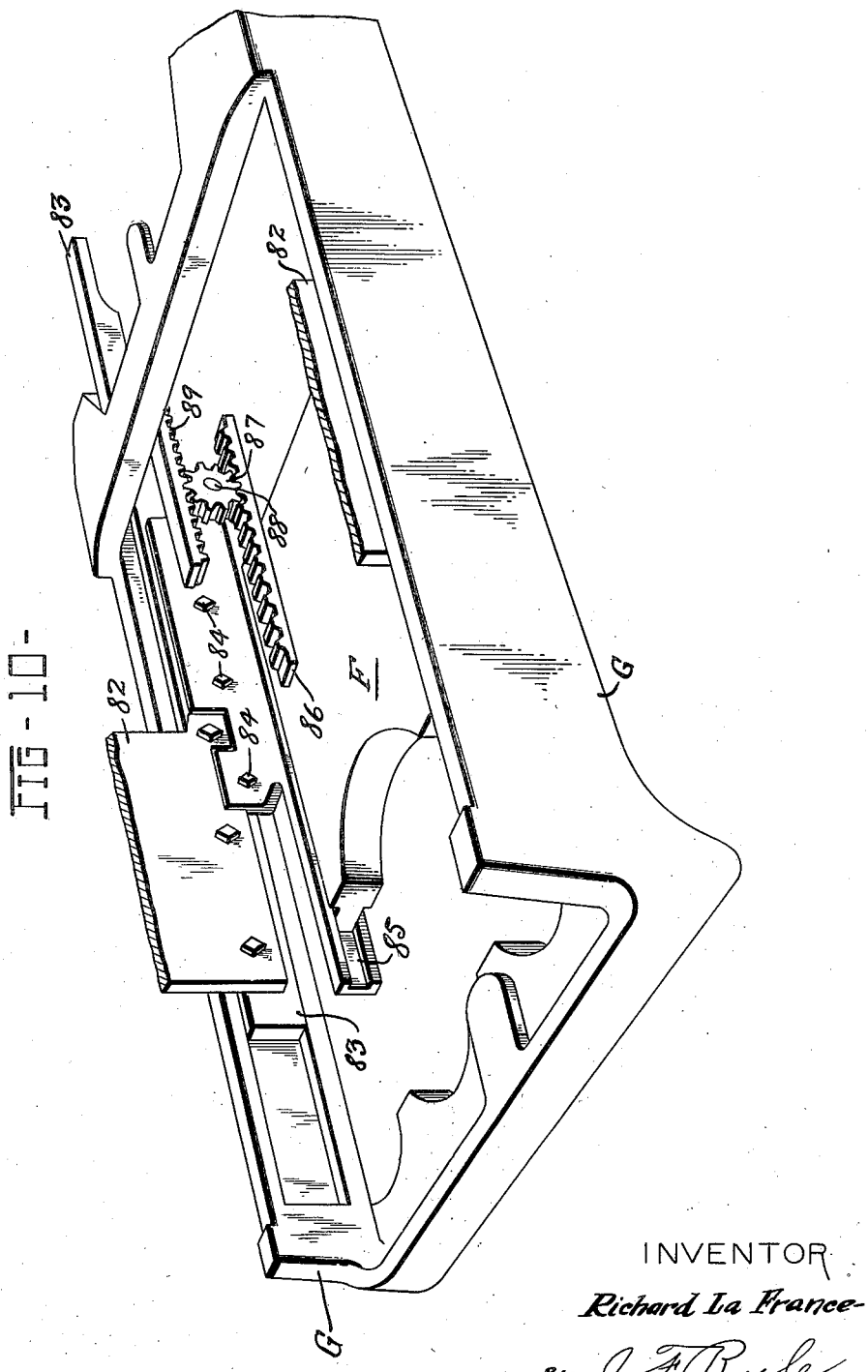

Patented Dec. 2, 1930

1,783,191

UNITED STATES PATENT OFFICE

RICHARD LA FRANCE, OF TOLEDO, OHIO, ASSIGNOR TO OWENS-ILLINOIS GLASS COMPANY, OF TOLEDO, OHIO, A CORPORATION OF OHIO

MACHINE FOR FORMING GLASS ARTICLES

Original application filed April 22, 1924, Serial No. 708,172. Divided and this application filed October 30, 1926. Serial No. 145,140.

The present invention relates to machines for forming glass articles, and more particularly to machines of the Owens type in which blank molds on a continuously rotating carriage dip into a pool of molten glass and are filled by suction, the blanks being later transferred to finishing molds in which they are blown to finished form. In machines of this type, a series of heads or units are arranged at equal intervals around the mold carriage, each unit comprising a blank mold or molds into which the glass is drawn by suction, a cooperating finishing mold or molds, and mechanism for effecting the suction, blowing and various mechanical operations required in forming the articles.

In a great majority of machines of this type now in use, a single gathering mold is provided on each head or unit so that only one blank of glass is gathered at a time. In other machines, each mold is provided with a plurality of mold cavities, so that a number of blanks are gathered simultaneously.

An object of the invention is to provide a practical and efficient machine of the character indicated in which each head or unit is equipped with a plurality of molds each having several cavities so that production is greatly increased, and in the attainment of this object I have provided various novel features of construction and operation, among which may be noted the following:

A feature of the present invention consists in the provision of novel pressure equalizing mechanisms used in connection with the blank and finishing molds, such mechanisms operating automatically to insure uniform closing and operation of the several molds.

Other features of novelty will appear hereinafter.

The present application is a division of my co-pending application, S. N. 708,172, filed April 22, 1924, on which Patent 1,641,497 was granted September 6, 1927.

In the accompanying drawings:

Fig. 1 is a sectional elevation of the machine, parts being broken away.

Fig. 2 is a plan view of the finishing mold frame and parts carried thereby, and illustrating the equalizing mechanism in the position occupied while the molds are closed.

Fig. 3 is a part sectional plan view of the finishing mold carrying frame showing the finishing mold in open position, and the relation of the pressure equalizing mechanism to associated parts.

Fig. 4 is a detailed sectional view at the line IV—IV of Fig. 3.

Fig. 5 is a sectional view at the line V—V of Fig. 4.

Fig. 6 is a plan view showing the blank mold carrying frame, the blank molds, and their operating mechanism including the pressure equalizing means.

Fig. 7 is a sectional view at the line VII—VII of Fig. 6.

Fig. 8 is a sectional elevation at the line VIII—VIII of Fig. 6.

Fig. 9 is a bottom plan view of a pair of blank mold sections and equalizing mechanism.

Fig. 10 is a persective view of a blank mold carrying frame.

Referring particularly to Figure 1, the machine comprises a base 60 on which is mounted a casting 61 supporting the mold carriage which rotates continuously about a central stationary column including a section 62. Stationary cams for actuating various parts of the machine are mounted on said column. The mold carriage comprises a lower frame portion 64 and an upper frame portion 65, united by the frames which support the individual heads or units arranged at equal intervals around the carriage. Each of said units includes blank molds, finishing molds and mechanism for actuating the molds and for effecting the various operations on the glass. Each unit is supported by a framework A (see Fig. 1) on the mold carriage, said framework including standards 66 rising from the frame member 64, upwardly and inwardly inclined frame members 67 and vertical portions 68. Mounted to reciprocate vertically in the frame A, is a frame B to the lower end of which is bolted a blowing head C which carries the neck molds D.

The blank molds E comprise sections 80 and 81 carried respectively on frame members F and G (see Figs. 6, 8 and 9) supported on the frame B so that the blank molds are carried up and down with the frame B. The frames F and G are mounted for horizontal reciprocation to move the blank mold sections from their separated position (Fig. 8) to the closed position shown in full lines in Figure 6. Referring to Figure 10, the plates 82 forming part of the frame B are bolted to rails 83 on which the frame G is slidable horizontally. Connected to the rails 83 by bolts 84 are inner rails or tracks 85 on which the frame F is mounted to slide horizontally. The frame F has fixed thereto rack bars 86 driven by pinions 87 on a shaft 88 journalled in the sides of the frame B. The frame G supports a rack bar 89 running in mesh with one of the pinions 87.

The movement of the frames F and G for opening and closing the blank molds is controlled by a cam 91 (Figs. 1 and 8) on which runs a roll 92 on a slide block 93 mounted to slide in guideways 94 on the frame A. The slide block 93 is connected through a pair of rods or links 95 to a slide block 99 mounted to reciprocate on the frame G. The connection between the links 95 and the block 93 (see Fig. 8) comprises a head 96 pivoted to said links and slidable on a rod 97 attached to the slide block 93. A coil spring 98 interposed between said head and the end of the rod provides a yieldable connection which prevents excessive strain or breakage of parts if any obstruction prevents the mold frames from moving freely under the influence of the cam. The connection between the slide block 99 and the frame G (see Figs. 6 and 8) comprises an equalizing lever 110 connected at its center to the block 99 by a pivot pin 111. The lever 110 is connected at one end through a link 112 to the frame G and at its opposite end is connected through a link 113 to the rack bar 89.

The stationary cam 91 is shaped to effect the opening and closing movements of the molds E at the required times as the carriage rotates. As said cam moves the roll 92 inward or toward the center of the machine, the frame G and rack bar 89 are drawn inward through the connections just described, thereby moving the blank mold sections 81 inward. The inward movement of the rack bar 89 operates through the pinion 87 and rack 86 to move the frame F and blank mold sections 80 thereon outward to meet the inwardly moving sections 81, thereby closing the blank molds. The inward movement of the frame G may be arrested and the position of the mold sections 81 determined by the frame G striking the end of the guide rails 83 (Fig. 10). The equalizing lever 110 permits the blank molds to be fully closed and centered. Thus, if the frame G is brought to its stop position before the blank molds are fully closed, the lever 110 will be moved about its point of connection with the frame G as a fulcrum, thereby causing a continued movement of the rack bar 89, pinion 87 and rack bar 86 to complete the movement of the frame member F and thereby completely close the molds. In a similar manner, the equalizing lever operates to center and close the molds if the frame member F should be brought to its stop position before the molds are fully closed.

Equalizing levers 114 (Figs. 6 and 9) are connected by pivots 114$^a$ to the frames F and G. Each lever bears at its ends against a pair of mold sections 80 or 81. If, during the mold-closing movement of the frame F, for example, one of the mold sections 80 is arrested by its centering pins 80$^a$ before the other section, the final movement is transmitted through the lever 114 to bring the other mold section to its closed position and equalize the pressure on the two mold sections. The mold sections have sufficient play on their supporting pins 80$^b$ to permit this centering movement and equalization of pressure.

The frame B which carries the blank molds E is lowered to dip the molds into the molten glass in a tank 133 (Fig. 1) for gathering charges by suction as the molds travel over the tank. The lowering and lifting of the molds is effected by a stationary cam 134 (Fig. 1). A cam roll 135 running on the cam 134 is carried by a slide block 136 mounted to reciprocate radially of the machine in guides 137 on the frame A, said block having suitable connection to the frame B.

The finishing molds and their actuating mechanism will be understood by reference to Figures 1, 2 and 3. The finishing molds F for each head or unit are carried on a finishing mold frame 261 having trunnions 262 by which the frame is pivotally mounted on the mold carriage, permitting the frame to swing downward to the Figure 1 position for passing beneath the tank 133. After passing beyond the tank, the frame is swung upward to the horizontal position, and the finishing molds close around the blanks which at this time are suspended from the neck molds, the blanks being then blown to their final shape in the finishing molds. The swinging movements of the mold frame 261 are controlled by a stationary cam track 263 on which runs a roll 264 on the mold frame.

The mold frame 261 carries a pair of finishing molds, each of which comprises an inner section 265 and an outer section 266 mounted to swing about a pivot 267 for opening and closing the mold. Said sections are respectively connected through links 268 to arms 269 and 270 having a pivot 271. The arm 269 is connected through a link 272 to an equalizing lever 273. The arm 270 is formed with a gear segment 274 running in mesh with a gear segment 275, the latter connected through a link 276 to the lever 273. The links 272 and 276 are separately adjustable in length for individually adjusting the mold sections to their closed position. The equalizing lever 273 is connected by a pivot 277 to a lever 278 pivoted at 279 to the mold frame. Each finishing mold frame carries a pair of the levers 278 and the operating connections just described between said levers and the molds. The levers 278 are connected through a pair of links 281 to a pivot pin 282 mounted in a slide bar 283 slidable radially of the machine in guides 284 on the mold frame. The slide 283 is actuated by a stationary cam 285 (Fig. 1) on which runs a cam roll 286 on a slide block 287 which has an operating connection 288 with the slide 283 (see Figs. 2 and 3).

The finishing molds are opened by an inward movement of the cam roll 286 which operates through the connections just described to move the parts from the position shown in Figure 2 to that shown in Figure 3. That is to say, as the slide 283 moves inward or toward the center of the machine, it operates through the links 281 to swing the levers 278 about their fulcrums. During this movement, the link 272 swings the arm 269 sufficiently to withdraw the mold section 265 to the Figure 3 position. At the same time, the link 276 operating through the gears 275 and 274 swings the mold section 266 through an arc of approximately 90 degrees to the Figure 3 position, out of the path of discharge of the finished bottles. The movement of the outer mold section 266 is considerably greater than that of the inner section, owing to the fact that the link 276 is connected to the lever 273 at a greater distance from the fulcrum 279 than the link 272. The arc through which the mold section 266 swings could also be varied by relatively varying the radii of the gear segments. The equalizing lever 273 has a limited movement about its fulcrum, determined by stops 289 on the lever 278. This permits a slight relative movement of the mold sections as the mold closes, so that said sections will automatically adjust themselves to their closed position.

In order to provide equalizing means in the operating connections for each pair of finishing molds, the pivot pin 282 (see Fig. 5) is mounted for a limited lateral movement in the slide block 283. The opening 291 in said block which receives the pivot pin is substantially rectangular, as shown in Figure 5, and somewhat longer than the diameter of the pivot pin to permit said lateral movement. With this arrangement, if either finishing mold reaches its closed position slightly in advance of the other mold and before the slide 283 has completed its movement, the connection just described will permit the final movement of the slide to be transmitted for completely closing the other mold.

Modifications may be resorted to within the spirit and scope of my invention.

What I claim is:

1. In a glass forming machine, the combination of a pair of molds arranged side by side and each comprising separable sections, a pair of levers, operating connections between each lever and the sections of one mold for closing the molds when the levers are operated in one direction, a slide block, and toggle links pivotally connected to said slide block and to said levers for transmitting motion from the slide block to the levers, the pivotal point of connection between each toggle link and the slide block being shiftable relatively to the slide block to permit an equalization of pressure transmitted through the toggle links to the molds when one mold is brought to a closed position in advance of the other.

2. In a glass forming machine, the combination of a pair of molds arranged side by side and each comprising separable sections, a pair of levers, operating connections between each lever and the sections of one mold for closing the molds when the levers are operated in one direction, a slide block, and toggle links having a common fulcrum on said slide block and connected at their outer ends to said levers, said fulcrum shiftable on the slide block in a direction to permit an equalization of the pressure transmitted through the toggle links to the molds when one mold is brought to a closed position in advance of the other.

Signed at Toledo, in the county of Lucas and State of Ohio, this 27th day of October, 1926.

RICHARD LA FRANCE.